United States Patent [19]

Zahner

[11] 3,788,038

[45] Jan. 29, 1974

[54] PROCESS FOR SEPARATING URANIUM ISOTOPES

[75] Inventor: John C. Zahner, Princeton, N.J.

[73] Assignee: Mobil Oil Corporation

[22] Filed: Jan. 12, 1972

[21] Appl. No.: 217,245

[52] U.S. Cl. ................................................. 55/17
[51] Int. Cl. ............................................ B01d 57/00
[58] Field of Search .............................. 55/17, 277

[56] References Cited
UNITED STATES PATENTS

| | | | |
|---|---|---|---|
| 3,465,500 | 9/1969 | Fenn ...................................... | 55/17 |
| 3,626,665 | 12/1971 | Fenn et al .............................. | 55/17 |

*Primary Examiner*—Charles N. Hart
*Attorney, Agent, or Firm*—Andrew L. Gaboriault et al.

[57] ABSTRACT

Uranium isotopes can be separated utilizing shock separation techniques by introducing gaseous uranium hexafluoride at supersonic velocity into a circular or elongated duct such that parallel flow streamlines are present; placing within the supersonic parallel flow stream a plurality of hollow probes at different distances along the axis of flow said hollow probes having critical dimensions relative to the mean free path of said flow stream in front of said probes so as to cause a detached stationary shock to form ahead of each of said probes leading edges and regulating the flow through the probes in relation to the flow through the duct to arrive at a process having enhanced economic benefit. In a preferred embodiment there is present a substantial number of probes in a given axial position.

5 Claims, No Drawings

3,788,038

PROCESS FOR SEPARATING URANIUM ISOTOPES

CROSS REFERENCE TO RELATED APPLICATIONS

This application is concerned with an improvement over the processes disclosed and claimed in U.S. Pat. No. 3,465,500 as well as U.S. Pat. No. 3,626,665.

BACKGROUND OF THE INVENTION

1. Field of the Invention

This invention relates to a process for separating the components of a mixture of gases including relatively light and heavy species and, more particularly, to a process for separating uranium isotopes, i.e., $U^{235}F_6$ from $U^{238}F_6$. This invention is concerned with providing a process which is extremely efficient in regards to maximizing the total amount of separative work which can be accomplished in a system employing shock separation techniques in relation to the total amount of energy spent to accomplish said work.

2. Description of the Prior Art

The problems involved in the separation of the various components of gaseous mixtures and, in particular, the separation of gaseous uranium isotopes, have been the subject of much attention for many years. Many solutions have heretofore been proposed for accomplishing the desired separation including differential diffusion through porous barriers; differential absorption; partial or complete liquefaction of one component; liquefaction of the entire mixture followed by fractional distillation or rectification; producing a supersonic jet of the gaseous mixture and placing a sampling probe on the axis of said jet and the like. Although each one of the above methods has had some degree of success, nevertheless, in general, these methods have proved costly.

A dramatic breakthrough in this field is disclosed and claimed in U.S. Pat. No. 3,465,500, wherein a completely new and different scientific principle is utilized in effecting the separation of the components of a gas containing both light and heavy species. Briefly, said application is concerned with shock separation and comprises accelerating a gaseous mixture containing heavier and lighter species to form a stream flowing at supersonic velocity, placing a plurality of hollow probes throughout a traverse cross section of said stream, forming a shock wave in front of the leading edges of each of said probes whereby the heavier species flows into the probes and the lighter species is deflected so that it flows around the probes, maintaining reduced pressure within the probes and withdrawing gas enriched in the heavier species from the probes.

An additional improvement in this field is disclosed and claimed in U.S. Pat. No. 3,626,665. This application is concerned with maximizing the efficiency of shock separation process utilizing a plurality of probes in a single traverse section of a supersonic flow stream and regulating the amount of gas withdrawn through said probes within specified limits.

DESCRIPTION OF THE INVENTION

It has now been discovered that a substantial improvement over the heretofore practiced processes for the separation of uranium isotopes can be obtained by placing hollow probes at different distances along the axis of flow of a supersonic gas stream rather than having them all in the same transverse plane. In other words, this invention is concerned with an improvement over the aforementioned shock separation process and the specific adaption of the same to the separation of uranium isotopes.

It should be immediately realized that there is a vast difference between providing a separation process which will maximize the enrichment of either a heavier or lighter component of a gaseous mixture and providing a process which will accomplish the same in an efficient manner not only with respect to the total amount of energy expended but also with respect to capital investment. Thus, by way of considerable oversimplification, it has been found that the most efficient separation process does not reside in that situation where the maximum enrichment of heavier species is withdrawn from the sampling probes in a shock separation process. Thus, by way of considerable oversimplification, the art has long recognized that in the separation of $U^{235}F_6$ from a mixture of the same with $U^{238}F_6$, the most advantageous economic situation occurs when a so-called ideal cascade is obtained.

As is known, a cascade is merely a plurality of separation stages and this is true whether the particular process utilizes shock separation techniques or conventional gas diffusion techniques. In each stage of a cascade there is a feed stream, an enriched stream conventionally referred to as heads, and a depleted stream conventionally referred to as tails. The ideal cascade for uranium isotope separation is known in the art to be the cascade arrangement that leads to minimum total interstage flow. The ideal cascade is approximated by isotope separation plants designed for minimum cost, and is known to be attained for the uranium hexafluorides when each stage has a heads-to-feed ratio of 0.5

Representative teachings of the prior art disclosing the above can be found in Nuclear Chemical Engineering, McGraw-Hill Book Company, Inc. (1957).

It is to be immediately understood that although it is known in the art that the ideal cut should be at 0.5, such did not mean that it was possible to achieve said cut for a given process because of the physical limitations inherent in each process. Thus, in aforementioned Ser. No. 854,245 the maximum cut obtainable was not the ideal 0.5 but rather 0.75.

In said application Ser. No. 854,245, it was disclosed that the pumping work that must be done in a plurality or cascade of shock separation stages, or in a single stage, utilizes a system that had all its probes in a single transverse plane, per unit of separative work that is performed is governed by approximately the following relation:

$$2 RT [\theta' \ln (Pi/PT) + (1-\theta') \ln (Pi/P_h)]/X (\alpha-1)^2 \theta (1-\theta)$$

wherein R is the standard gas constant and T is a temperature whose value is dependent upon the particular gas, $\alpha$ is the ratio of $U^{235}F_6/U^{238}F_6$ present in the heads gas divided by the ratio of $U^{235}F_6/U^{238}F_6$ in the tails, $\theta$ is the cut, i.e., the ratio of total $UF_6$ heads to total $UF_6$ flow upstream of probes, Pi is the initial pressure of the $UF_6$ before passing through the convergent/divergent nozzle; $P_h$ is the pressure of the gas after it passes through the second convergent/divergent nozzle and Pt is the pressure from which the $UF_6$ enriched in the heavier isotope withdrawn from the probes must be recompressed in order to enter the next stage. $\theta'$ is the ratio of total gas flow downstream of the probes to total gas flow upstream of the probes and X is the mole fraction of $UF_6$ in the intial gas mixture before passing through the convergent/divergent nozzle.

The most efficient process for the separation of uranium isotopes occurs when the above expression is at a minimum, i.e., the pumping work is minimized per unit of separative work.

However, the above formula was applied to a system where only one transverse array of probes was used and in such a system the separation factor, i.e., $\alpha - 1$ becomes nil as $\theta$ goes below 0.75. This is so because in said system, if $\theta$ goes below 0.75 there is a tendency for the shock waves to be swallowed by the probes.

It has now been discovered that the limitation with respect to cut inherent in the above described system can be overcome by utilizing probes in different transverse sections along the axial line of flow. Although each array of probes in a transverse section will still be governed by a lower limit on the cut of 0.75, the sum total of all the cuts from each transverse section can be made to approach the ideal cascade cut of 0.5, or even lower.

As has heretofore been pointed out, the novel contribution of this invention resides in placing probes in different transverse planes relative to the axis of flow.

Across each traverse cross section of the duct is placed a plurality of hollow sampling probes which are spaced sufficiently far apart so that the standing shock formed in front of one probe does not interfere with the standing shock formed in front of another probe. It has been found that this condition can be met when the probes are no closer together than a distance equal to the diameter of one of the probes.

It is known that the separation obtained in a shock process depends among other factors upon the characteristic dimension of the front end of the probes. If each probe is a cylindrical tube the characteristic dimension is the diameter of the tube. If the front end of the probe is a slot then the width at the leading edge is the characteristic dimension. It has been found that in order to obtain a process wherein the separative work can be maximized that it is necessary that the ratio of the mean free path of the uranium hexafluoride measured in supersonic stream upstream of the shocks to the characteristic dimension based on the probe's leading edge should be such that the combination has a Knudsen number of from .001 to 1.0 and preferably 0.01 to 0.1.

It has also been found that the total area of the openings in the hollow slots or probes in each transverse plane must be equal to from about 0.05 to about 0.5 of the total cross sectional area of the duct in which they are placed.

The total number of different transverse planes in which the probes are placed must be from 3–20 in order to obtain the improved benefits of this invention. The preferred number of different transverse planes which are utilized are 4–12.

The advantages obtained in the process increase as the number of planes increases, but in progressively diminishing fashion, so that there will be an optimum number beyond which the added cost will no longer be economically desirable. Also, in the instant invention, the number of planes utilized for the disposition of the probe system should not exceed that number which will cause the flow of gas in the duct to become subsonic.

The distance between each different transverse plane in which the probes are placed is not narrowly critical. However each plane should be spaced from another, a distance which is equal to about 3–10 probe lengths, wherein a probe-length is defined as the length of the probe in the direction of flow.

A particularly preferred embodiment of this invention resides in those situations wherein the probes in each transverse plane are spaced substantially an equal distance apart from each other. The reason why this is preferred is that still another benefit is obtained when the probes in each plane are substantially equally spaced one from the other. This occurs because the feed to the second transverse plane is enhanced in quality since some of the undesirable, heavier isotopes have been removed in the first plane. Similarly, the feed to probes in the third plane is still more enhanced, etc.

At the outset, according to the novel process of this invention, uranium fluoride is compressed until it has a pressure ranging from 2 to 30 psia and a temperature of from about 150° to 500°F. This uranium fluoride is then passed through a convergent/divergent nozzle so that it leaves the nozzle at a velocity of from about Mach 1.5 to about Mach 4, a pressure of from 0.001 to 0.1 psia and a temperature of about 75°–150°F. Thus, uranium hexafluoride is then passed through an elongated or circular duct such that substantially only parallel flow streamlines are obtained. This condition is met when said uranium hexafluoride stream flows in a duct and completely fills said duct.

Across different transverse planes of said duct there are placed a plurality of hollow probes which are interconnected to a manifold which is, in turn, connected to a pump. In a manner well known in the art, a reduced pressure is maintained in the manifold and a standing shock wave is formed in front of each probe. The heavier species of the gas enters into the first transverse plane of probes and is withdrawn through the manifold whereas the lighter species of the gas flows around the first plane of probes to the next transverse plane of probes where the separation is repeated, etc.

After the gas leaves the last plane of probes, it passes through a second convergent/divergent nozzle where it is compressed to a higher temperature and pressure.

The above represents but one stage of a separation process and in actual operation there will be a plurality or cascade of such stages. Thus, the gas leaving the last plane of probes (the heads) after recompression is fed to another stage. Similarly, the tails can be combined and fed to another stage.

EXAMPLE

A mixture containing 0.700 parts of $U^{235}F_6$ and 99.300 parts of $U^{238}F_6$ is compressed such that it has a temperature of 300°F. and a pressure of 7.5 psia. This material is then passed through a convergent/divergent nozzle such that it has a velocity of about Mach 4, a pressure of about 0.02 psia, and a temperature of about 75°F. The gas, travelling at supersonic velocities, passes through an elongated tubular duct, completely fills said duct such that there exists parallel flow lines. Probes comprising a plurality of knife edge slots of about 1 to 2 mm between edges are spaced across the traverse cross section of the duct. Under these conditions the Knudsen number of the flow referred to the slot edge-to-edge dimension is maintained at approximately 0.01.

The total open area of said probes at a given transverse plane facing in the upstream direction is about 0.10 of the total cross section of said elongated tubular duct. Probes are placed in transverse planes at 10 axial positions.

A reduced pressure is maintained in each transverse plane of probes by a common manifold connected to a pump and a fraction of UF$_6$ is withdrawn. This fraction which is the mixture of the tails from each plane of probes is enriched in U$_{238}$ and analyses about 99.3055 parts by weight of U$^{238}$F$_6$ and about 0.6945 parts by weight of U$^{235}$F$_6$. This withdrawn fraction has a pressure of about 0.3 psia and a temperature of about 350°F. It is preferably recompressed and fed to another separation stage.

The fraction of UF$_6$ flowing around the last transverse plane of probes is passed through a convergent/divergent nozzle so that it has a pressure of about 2.0 psia and a temperature of 350°F. It contains about 0.7055 parts of U$^{235}$F$_6$ and about 99.2945 parts of U$^{238}$F$_6$.

This fraction enriched in lighter isotope is preferably recompressed and passed through other similar separation stages.

By any suitable means, such as insertion of a throttling valve into the pump which is connected to the probes, the amount of uranium hexafluoride which is withdrawn from the probes is carefully regulated such that the ratio of the total uranium hexafluoride flow downstream of the probes to the total uranium hexafluoride flow upstream of the probes is about 0.50.

Although this invention has been described primarily with respect to the separation of U$^{235}$F$_6$ in admixture with U$^{238}$F$_6$, it is to be understood that it is equally applicable to the separation of other gaseous mixtures.

What is claimed is:

1. A process of separating uranium isotopes from a gaseous mixture containing the same which comprises:
   a. accelerating said mixture of uranium isotope gases through a nozzle into a duct such that it forms a stream that emerges at supersonic speed and expands to have a Mach number of from 2 to about 5, a temperature of about 75°–150°F. and a pressure from about 0.001 to 0.1 psia;
   b. placing an array of hollow probes in the supersonic stream in at least 3 different transverse planes with respect to the axis of flow at a sufficient distance from said nozzle to cause a detached stationary shock to form ahead of each probe's leading edges, all of said probes being disposed entirely within the supersonic portion of said stream and said stream completely filling said duct, all of said probes in a given transverse plane having axes which are separate and distinct from each other and which are located in different transverse portions of said stream and the total area of the openings facing upstream of said probes in said given transverse plane being from about 0.05 to about 0.5 of the total area of said duct;
   c. selecting the distance between opposite leading outside edges of said probes, relative to the mean free path of the free stream of gas ahead of said probes such that the combination has a Knudsen number between 0.001 and 1.0;
   d. maintaining a relatively low pressure in the interior of each of said probes;
   e. whereby the effect of the detached stationary shocks causes a lesser deceleration of said heavier uranium isotope than of said lighter uranium isotope of said mixture and thus results in an increased relative concentration of said heavier isotope within said probes;
   f. continuously withdrawing a portion of the gas stream through said probes enriched in said heavier isotope.

2. The process of claim 1 wherein the gaseous mixture comprises U$^{235}$F$_6$ and U$^{238}$F$_6$.

3. The process of claim 1 wherein the gaseous mixture which does not flow through the last transverse plane of probes is passed through a convergent/divergent nozzle wherein it exits at a pressure of from about 1 to about 10 psia and a temperature of from about 150°–500°F.

4. The process of claim 1 wherein a cascade of separation stages are employed.

5. The process of claim 4 wherein said probes consist of a plurality of knife-edged members.

* * * * *